UNITED STATES PATENT OFFICE.

SEBASTIAN WOLF, OF STAHLHAMMER, UPPER SILESIA, GERMANY.

RECOVERING SODA.

SPECIFICATION forming part of Letters Patent No. 405,754, dated June 25, 1889.

Application filed December 22, 1887. Serial No. 258,747. (No specimens.)

*To all whom it may concern:*

Be it known that I, SEBASTIAN WOLF, a subject of the Emperor of Germany, and a resident at Stahlhammer, Upper Silesia, Germany, have invented new and useful Improvements in the Manufacture of Cellulose, of which the following is a specification.

This process consists, essentially, in the application of the calcareous deposits or lime-mud constituting a by-product of the manufacture of wood pulp to the neutralization of acid sulphate of soda and the simultaneous recuperation of the alkali salts remaining in the calcareous mud through incomplete washing—such as carbonate of soda, caustic soda, &c.—which effect the precipitation and consequent removal of the iron, clay, lime, magnesia, &c.

In the manufacture of wood pulp the liquor obtained in the boiling process contains in suspension particles of wood, and has a dark-brown color. It will be hereinafter called the "brown liquor." It is well known that this liquor is at present evaporated and made red-hot—that is, fused—for the purpose of transforming it into carbonate of soda, &c., and regenerating the alkaline salts. Water is added to the mass that has thus been submitted to red heat and melted, and to facilitate the transformation of the carbonate of soda into caustic soda the solution is boiled with burnt lime—that is to say, is rendered caustic. The rendering caustic of the liquor and the washing out of the calcareous mud takes place "methodically" in a series of large tanks or vats provided with stirring devices. The calcareous deposit thus obtained, which contains the lime as carbonate of lime, is left to settle down, and after many washings allowed to run away. It contains, according to the more or less complete washing, 0.5 to one per cent. of alkaline salts, which, like the lime, are lost and waste products. The unavoidable losses of alkaline salts which have hitherto taken place in the manufacture have been compensated by the addition of soda. Of late years neutral sulphate of soda has been applied for this purpose according to Dahl's method. The acid sulphate of soda, which finds almost no application in the industry, and which is a by or waste product of the manufacture of nitric acid, where it is obtained in large quantities, could not up to the present be employed for this purpose, because the free or unsaturated sulphuric acid neutralizes partially the caustic alkalies, and thereby renders them ineffective in the boiling process. The manufacturers of cellulose were therefore compelled to buy from soda-manufacturers neutral pure sulphate of soda, which, when it contains ninety-five to ninety-eight per cent. of pure sulphate of soda, costs five or six shillings per one hundred kilograms, while the acid sulphate of soda containing seventy to seventy-five per cent. of neutral sulphate of soda can be obtained for one shilling and less. According to this process it is possible for cellulose-manufacturers to utilize the acid sulphates of soda for their purpose in a simple manner by using it to transform the calcareous mud into gypsum, a well-known manure, and recover the unwashed alkalies out of the calcareous mud.

The mode of working is as follows: After the calcareous mud used in rendering caustic the boiled liquor has been washed in the stirring-vat and the last wash-water removed, (fresh) water is added to this mud and the stirring appliance put in motion. A basket made of iron bars is suspended in the stirring-vat. This basket retains the solid substances, which cannot fall through, while the liquor can come into it from the outside. A weighed quantity of acid sulphate is introduced gradually in this basket, while the water and the stirred-up calcareous mud are constantly being brought into contact with this sulphate. The sulphate gets dissolved in the water, and is neutralized by the lime in suspension, while carbonic acid is being evolved in an active manner. The dissolution and decomposition are accelerated by application of heat, either through heating-pipes or by steam acting directly. The quantity of sulphate to be added is calculated from the amount of acid sulphate of soda contained in the sulphate and from the quantity of carbonate of lime according to the following equation: $2NaSO_4H + CaCO_3 = Na_2SO_4 + CaSO_4 + CO_2 + H_2O$. According to this, one hundred parts in weight of acid sulphate of soda require 41.6 parts in weight of carbonate of soda. The same equation shows that in the same process gypsum and carbonic acid are produced, besides neutral sulphate of soda. The gypsum can be used as manure; the carbonic acid can eventually be collected and liquefied. As the calcareous deposit contains almost always large quantities of iron, clay, magnesia, &c., the latter get transformed into soluble sulphates in the neutralization process. These sulphates must be removed, as they would exert an injurious action in the latter process. This takes place already partly in the said process through the caustic alkalies existing in the calcareous mud. The separation of these metals is completed when, toward the conclusion of the operation, the whole mass is stirred and boiled for a quarter of an hour by means of high-pressure steam. It is also good, for the purpose in view, to add to the above a good quantity of raw lye that has not yet been rendered caustic and which contains much carbonate of soda. The carbonate of soda and the caustic soda, sulphide of soda, (Schwefelnatron,) &c., precipitate the lime and magnesia in the state of carbonates—the iron partly as sulphide of iron and partly as hydrated oxide of iron, the aluminium as alumina hydrate. The alkaline salts are transformed into sulphate of soda as expressed by the following equations:

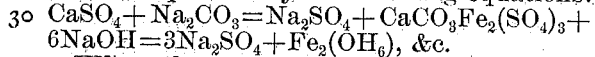

When the precipitation is complete, the precipitate is allowed to settle down. To ascertain whether the precipitation is complete, a test is made by filtering a little quantity of the liquid and testing the filtered matter with carbonate of ammonia. The liquor which is at the top is an almost pure chemical solution containing neutral sulphate of soda ready for immediate use.

The way of operating is as follows: The solution can be let flow into the reservoirs destined to receive the brown liquor at the same time as the latter leaves the pan after the boiling is over. The brown liquor and solution are then evaporated, &c. It is, however, more to the purpose to proceed as follows: In order to avoid the evaporation of the greatest part of the liquor which flows along with the solution of Glauber salts into the brown liquor, this solution is used instead of water for the purpose of diluting the mass that has been made red-hot and fused. The same (the solution) is added to the boiled lye, and undergoes with it the boiling operation. This process can of course be modified in various ways. Thus, instead of the calcareous deposit, common burnt or quick lime or other basic or alkaline substances can be used for the neutralization—for instance, the boiled lye itself or the brown liquor. If the two latter are taken, (the boiled lye or the brown liquor,) the process becomes thereby much simpler. If the sulphate is added to the boiled lye, the free or half-combined sulphuric acid will neutralize one part of the caustic lye and render it inactive in the boiling process; but this injurious action of the sulphuric acid can be easily obviated. It is only necessary to take care that by the use of a concentrated lye the solution which is produced after the addition of the sulphate contains still a sufficient quantity of free alkali. If, for instance, sixteen cubic meters of lye are employed usually in the boiling process, and that this lye has an alkalinity of six per cent., (calculated after the soda,) and that three centners only of neutral sulphate of soda are usually necessary to make up for the losses of alkalies, it will be necessary, on employing acid sulphate of soda containing seventy per cent. neutral sulphate of soda and thirty per cent. free sulphuric acid, to use 4.28 centners of sulphate. These 4.28 centners of sulphate contain 1.28 centners of free sulphuric acid, which, according to the following proportion, neutralize 0.81 centners of soda $98(SO_4H_2) : 62(Na_2O) = 128 : x;$ hence $x = 0.81.$ As the sixteen cubic meters of the lye possessing an alkalinity of six per cent. contain 19.20 centners of soda, it is therefore necessary, in order to obtain an alkalinity of six per cent. in the lye under addition of 4.28 centners of sulphate, to employ 20.01 centners of soda, or a lye the alkalinity of which is 6.25 per cent. instead of six per cent., (calculated as soda.) 1.85 centners of neutral sulphate of soda corresponding to the 1.28 centners of free sulphuric acid are thus obtained in the boiling lye. This is without disadvantage for the boiling process and advantageous in the melting process in the regeneration of the brown liquor, because the fused products become richer in sulphur combinations. If the sulphate be added to the brown liquor, the free sulphuric acid of the former precipitates a part of the organic matters, which, however, dissolve themselves again completely in the lye when a sufficient quantity of free alkali is present. Now, if too much sulphate is added, the resulting precipitate dissolves itself again completely, and the liquor, which was in the beginning black-brown and perfectly clear and transparent, becomes gray-brown, and when diluted with water the solution becomes turbid. In this case it is necessary, in order to obtain a uniform product, to mix again thoroughly the resulting precipitate with the solution when the lye is being rendered denser. However, to avoid this separation, the brown liquor is tested with a standard solution. For instance, one hundred cubic centimeters of the solution of sulphate are allowed to flow (in the standard solution) until the precipitate formed does not dissolve again. From this it will be easy to calculate how much sulphate must be employed.

As the sulphate obtained in the manufacture of nitric acid is frequently mixed mechanically with impurities, it is good, for the purpose in view, to dissolve it in water before adding it to the boiled lye or to the brown liquor, and to filter it. It is also advisable to divide the sulphate into two halves, one of which is added to the brown liquor and the other to the caustic lye. Thereby a separation in the brown liquor and an excess of sulphate of soda in the boiled lye are avoided.

The iron, clay, and other metallic salts contained in the impure acid or neutral Glauber salt obtained as by-products in the manufacture of zinc and copper can be removed in the same manner as that employed to render harmless the same salts in the acid sulphate of soda. The Glauber salt derived from the above manufactures of zinc and copper can thus be utilized in the manufacture of cellulose. The salt is brought along with the causticizing lime into the above-mentioned basket of a stirring-vat, which vat is filled with the so-called "raw" lye—that is to say, boiled lye that has not been made caustic. The salt dissolves, and at the same time the injurious metallic salts are separated by the alkaline lye and settle at the bottom with the calcareous mud and other impurities, such as dust, sand, &c.; or the salt can be dissolved by itself in water or in another liquor obtained in the manufacture, (such as wash-lye, &c.,) soda or boiled lye added to it, and the solution boiled and filtered; or the said solution of neutral sulphate of soda is used in the manner described in the foregoing.

Having thus described my invention and the manner of employing the same, what I claim, and wish to have secured to me by Letters Patent of the United States of America, is—

In the so-called "sulphate cellulose process," the herein-described improvement, consisting in adding to the brown lye of the process acid sulphate of soda which has previously been treated with the lime-mud of the said process, as and for the purpose set forth.

In testimony whereof I have signed my name to this specification in the presence of two subscribing witnesses.

SEBASTIAN WOLF.

Witnesses:
FRITZ ROUTSCHKY,
FRANZ SÖBEL.